United States Patent [19]

Albou

[11] Patent Number: 5,568,017
[45] Date of Patent: Oct. 22, 1996

[54] POWER SUPPLY SYSTEM FOR DISCHARGE LAMPS, AND A VEHICLE HEADLAMP USING SUCH A POWER SUPPLY SYSTEM

[75] Inventor: Pierre Albou, Paris, France

[73] Assignee: Valeo Vision, Bobigny Cedex, France

[21] Appl. No.: 412,603

[22] Filed: Mar. 29, 1995

Related U.S. Application Data

[63] Continuation of Ser. No. 52,555, Apr. 23, 1993, abandoned.

[30] Foreign Application Priority Data

Apr. 24, 1992 [FR] France .................................. 92 05079

[51] Int. Cl.$^6$ ................................................. H05B 37/02
[52] U.S. Cl. ..................... 315/219; 315/224; 315/290; 315/307; 315/DIG. 7; 315/205
[58] Field of Search ..................................... 315/219, 224, 315/307, DIG. 7, 289, 290, 82, 205

[56] References Cited

U.S. PATENT DOCUMENTS

| | | | |
|---|---|---|---|
| 3,780,342 | 12/1973 | Grimshaw et al. | 315/289 |
| 4,060,709 | 11/1977 | Hanson | 219/131 R |
| 5,051,661 | 9/1991 | Lee | 315/219 |
| 5,065,072 | 11/1991 | Albou et al. | 315/307 |
| 5,083,065 | 1/1992 | Sakata et al. | 315/307 |
| 5,208,515 | 5/1993 | Lee | 315/219 |

FOREIGN PATENT DOCUMENTS

| | | | |
|---|---|---|---|
| 0477587 | 4/1992 | European Pat. Off. | H05B 41/29 |
| 4033664 | 5/1991 | Germany | H05B 41/36 |
| 2071949 | 3/1981 | United Kingdom | 315/219 |

*Primary Examiner*—Robert Pascal
*Assistant Examiner*—Darius Gambino
*Attorney, Agent, or Firm*—Morgan & Finnegan, L.L.P.

[57] ABSTRACT

The present invention is concerned with a power supply circuit for discharge lamps, especially those intended for vehicle headlamps. It also relates to a headlamp having a power supply circuit. The latter has a half wave bridge structure, the discharge lamp being connected to the mid-point of the bridge. A primary of a transformer works as a quasi-resonant wave generator under the switching effect of a quasi-resonant interrupter, which is controlled by a control circuit for controlling the electrical state of the discharge lamp. In addition, starting of the lamp is effected by a second transformer, the primary of which is connected to a spark gap having a suitably chosen triggering voltage.

8 Claims, 5 Drawing Sheets

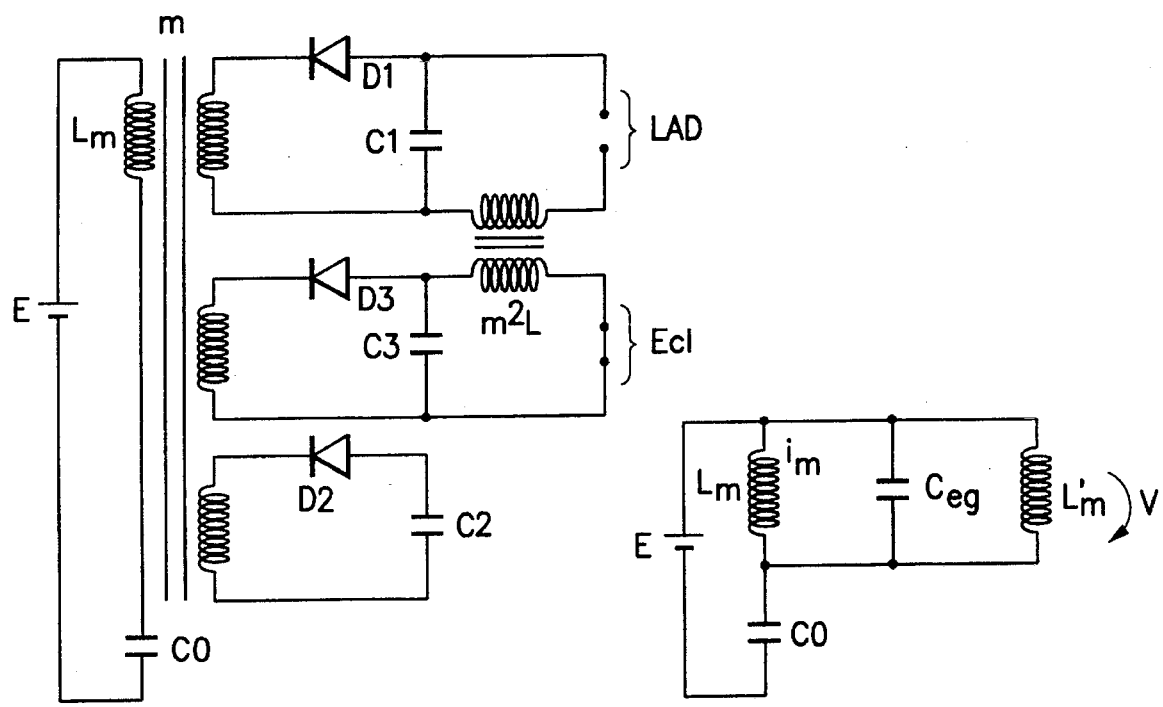
FIG. 14  FIG. 13
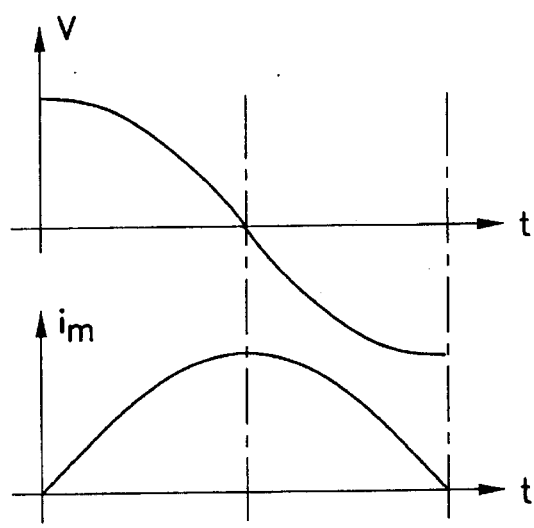
FIG. 15a
FIG. 15b

POWER SUPPLY SYSTEM FOR DISCHARGE LAMPS, AND A VEHICLE HEADLAMP USING SUCH A POWER SUPPLY SYSTEM

This is a continuation of application Ser. No. 08/052,555, filed on Apr. 23, 1993, now abandoned.

FIELD OF THE INVENTION

This invention relates to lighting systems including at least one discharge lamp and a power supply circuit for the discharge lamp or lamps, in particular such a system intended for a vehicle headlamp. The invention also relates to a vehicle lighting system including such a power supply circuit.

BACKGROUND OF THE INVENTION

In the prior art it has previously been proposed to provide power supply circuits which enable a first alternating voltage of high value to be produced for the purpose of starting the discharge lamp. Then, once the lamp has fired (i.e. once it has been lit), the power supply system generates an alternating voltage of low value.

In particular, such a power supply arrangement has been proposed which is constructed around a circuit of the kind known as an H bridge. However, such an arrangement requires four interrupter for all the branches of the bridge, with the discharge lamp being connected in the central branch of the bridge. Such interrupter may carry high currents. These components are therefore expensive, because they must have low losses in the conductive state, because at a given instant, two closed interrupter are in series with the load.

When these systems are to be produced in quantity production, these prior art arrangements show certain disadvantages in view of the fact that they must have operating reliability of a high order, since vehicle lighting systems must be conducive to maximum safety.

DISCUSSION OF THE INVENTION

The present invention proposes a power supply circuit adapted to produce at least two alternative supply voltages for the discharge lamp, but having only a reduced number of interrupter.

In addition, it is an advantage of the present invention that the number of control signals is reduced in such a circuit, while, with equal voltages, the value of the capacitance of the capacitors necessary is considerably reduced compared to a conventional half-wave bridge.

According to the present invention, a power supply circuit for at least one discharge lamp, having a starting means and a working power supply means for the continuous emission of light by the discharge lamp or lamps, is characterised in that the working power supply means is connected to an alternating voltage generating circuit, and in that it includes:

a rectifying means, for rectifying at least one cycle of the said alternating voltage, which has at least one pair of output terminals across which a mean rectified voltage is produced, together with a third terminal which is maintained at a potential intermediate between those of the two terminals mentioned above;

a pair of interrupter connected in series to the output of the rectifying means, and of which the common point is connected to a first terminal of the discharge lamp or lamps, the said interrupter being controlled by a control circuit in such a way as to produce a voltage and a current which produce a continuous emission of light by the discharge lamp or lamps; a second terminal of the discharge lamp or lamps being connected to an output terminal of the starting means, the other terminal of which is connected to the intermediate terminal of the rectifying means.

In one embodiment, the means for generating an alternating voltage is a wave generator which is quasi-resonant in voltage, and the output of which comprises at least one transformer secondary.

In one embodiment, the rectifying means comprises at least one series circuit constituted by a rectifying diode and capacitor adapted to store a predetermined quantity of electricity during an operating period of the power supply circuit. When the rectifying means includes two series circuits as mentioned above, it is one advantage of the invention, by comparison with a conventional half-wave rectifier circuit, that two capacitors are charged simultaneously. In a conventional half-wave rectifier, these capacitors are charged in series and must be dimensioned according to the cut-off frequency of the half-wave rectifier. This cut-off frequency which is low so that semiconductors, such as those known as "IGBT", which are slow, can be used, and so as to avoid the occurrence of electromagnetic interference with the connecting wires between the power supply circuit and the discharge lamp.

In the invention, the capacitors of the rectifying means filter the outputs of the quasi-resonant converter, the cut-off frequency of which may reach 1 Mhz ($10^6$ Hz). The capacitance of these capacitors can be low (of the order of 1000 times lower than that of capacitors in a convential half-wave bridge).

The invention also concerns a vehicle headlamp equipped with such a power supply circuit.

Further features and advantages of the present invention will appear more clearly on a reading of the description which follows, of preferred embodiments of the invention, which is given by way of example only and with reference to the accompanying drawings.

BRIEF DESCRIPTION OF THE DRAWINGS

FIGS. 8 to 13 are further circuit diagrams, equivalent to the circuit of FIG. 1, explaining, with reference to FIGS. 7a to 7d, the operation of the same embodiment of the invention when the lamp is lit.

FIG. 14 is an equivalent circuit diagram showing the starting circuit in the system according to the invention.

FIGS. 15a and 15b are graphs showing currents and voltages at various points in the circuit shown, in particular, in FIG. 14.

DESCRIPTION OF PREFERRED EMBODIMENTS OF THE INVENTION

Figure 1:
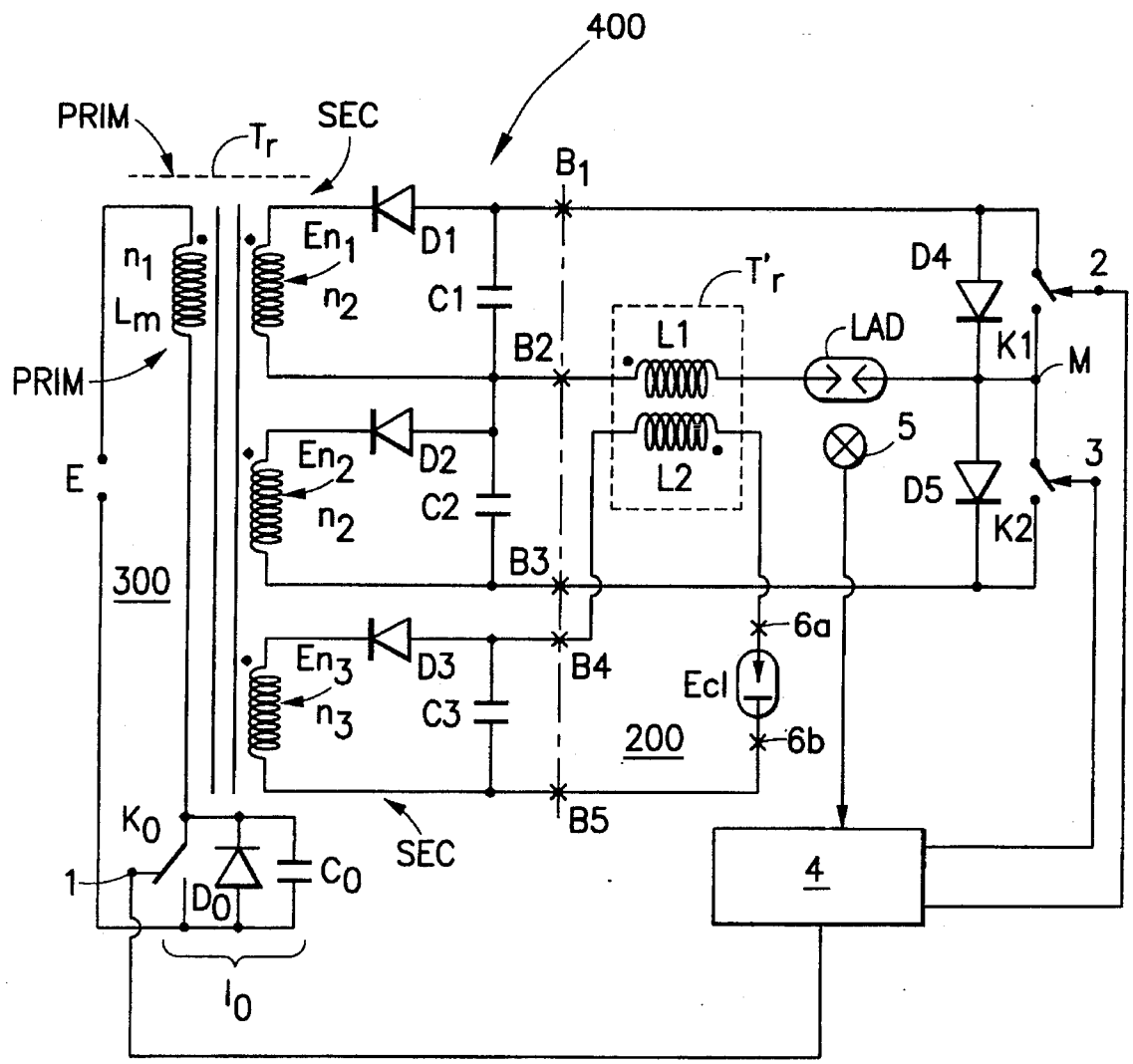
FIG. 1 is a circuit diagram of a power supply system for discharge lamps in a motor vehicle lighting system, in a first embodiment of the present invention.

In FIG. 1, showing a circuit diagram of a first embodiment of the invention, the power supply circuit includes means which produce a high tension alternating voltage. In a preferred embodiment, this means is in the form of a wave generator which is quasi-resonant in voltage. To this end, the power supply circuit includes a transformer Tr, the primary PRIM of which includes a winding of n1 turns, and has a leakage inductance with a value of Lm. The secondary SEC of the transformer Tr has a plurality of windings En1, En3 with n2 and n3 turns. The directions of these windings are identical and are indicated in FIG. 1 by dots.

The foot of the primary winding PRIM is connected to an interrupter I0 of the quasi-resonant type, which includes a switching element K0, the control electrode of which is connected to the output of a control circuit or control unit 4. The interrupter I0 forms, with the transformer, a quasi-resonant interrupter. The control unit 4 generates, in accordance with a pre-registered program, the switching phases of the various interrupters of the power supply circuit, in accordance with parameters which are measured by a suitable measuring means 5 (of any known type) at the input of the control unit 4.

In another embodiment modified from that described here, a control circuit of an analog type is used: given the present description, a competent person skilled in the technical field of the present invention will have no difficulty in making such a modification if desired.

In the preferred embodiment, the parameters which are measured by the measuring means 5 are the instantaneous current and voltage in the load LAD, which comprises at least one discharge lamp.

In one embodiment, the quasi-resonant interrupter consists of the switching element K0 in the form of a controlled interrupter, together with a diode D0 and a capacitor C0. Its function is to operate on high switching frequencies of the order of 100 KHz and more. To this end, the control electrode 1 is connected to a suitable output of the control unit 4.

The power supply circuit is constructed around a half-wave bridge connected to the secondary SEC of the transformer Tr, the latter being an impulse transformer. The half-wave bridge comprises two controlled interrupters K1 and K2. In the case where the component used does not incorporate any anti-parallel diode in its switching path (for example a component of a so called "IGBT" type), a diode D4 or D5 is connected in parallel with each interrupter K1, K2 respectively. In particular, in the case in which the interrupters comprise field-effect power transistors, the diode comprises the diode induced between source and drain.

The common point M between the two controlled interrupters K1 and K2 is connected to a first terminal of the load LAD. A second terminal of the load LAD is connected to a rectifier circuit 400 for rectifying at least one cycle of the alternating high voltage produced at the secondary S of the transformer Tr. The rectifier 400 has a pair of output terminals B1, B3. The first of these, B1, is connected to a first end of the series circuit comprising the two interrupters K1 and K2, while its second output terminal B3 is connected to a second end of the same circuit. The rectifying circuit 400 also has a further output terminal B2, which is connected to the above mentioned second terminal of the discharge lamp LAD.

In the preferred arrangement, the power supply circuit also includes a starting circuit 200 which is constructed around a spark gap Ecl. A spark gap comprises a discharge tube in which the starting voltage is lower and easier to attain than that of the discharge lamp LAD, the latter being arranged to produce a light flux which gives a suitable light emission as rapidly as possible.

The spark gap Ecl has two connection terminals. The first of these, 6a, is connected to one end of a primary winding L2 of a second transformer Tr', while the second terminal, 6b, is connected to an output terminal B5 of the rectifying circuit 400. The other end of the primary winding L2 is connected directly to a further output terminal B4 of the rectifying circuit 400.

The rectifying circuit 400 comprises a series of single-cycle rectifying cells, in which each cell comprises a diode and a capacitor. FIG. 1 shows three such cells: D1, C1; D2, C2; and D3, C3.

In a preferred embodiment, the transformer Tr has a leakage inductance characteristic L at the primary, which is taken into account in the operation of the quasi resonant interrupter. In the case in which this leakage inductance characteristic L is insufficient, a winding having a suitable predetermined value L can be added in the primary circuit, in series with the primary winding PRIM.

The power supply circuit is thus constructed with a quasi-resonant interrupter which is solely arranged across the primary of the transformer, and with two simple interrupter on its secondary side. One of the advantages of this arrangement lies in the possibility of providing a starting circuit or means without any need for a secondary wave generator. Because of the quasi-resonant converter, a simple frequency change enables the system to pass from the starting mode (at low frequency) in which a voltage can be attained between the terminals B4 and B5 which is greater than the starting threshold of the spark gap, to the working mode in which the frequency is higher.

Figure 2:
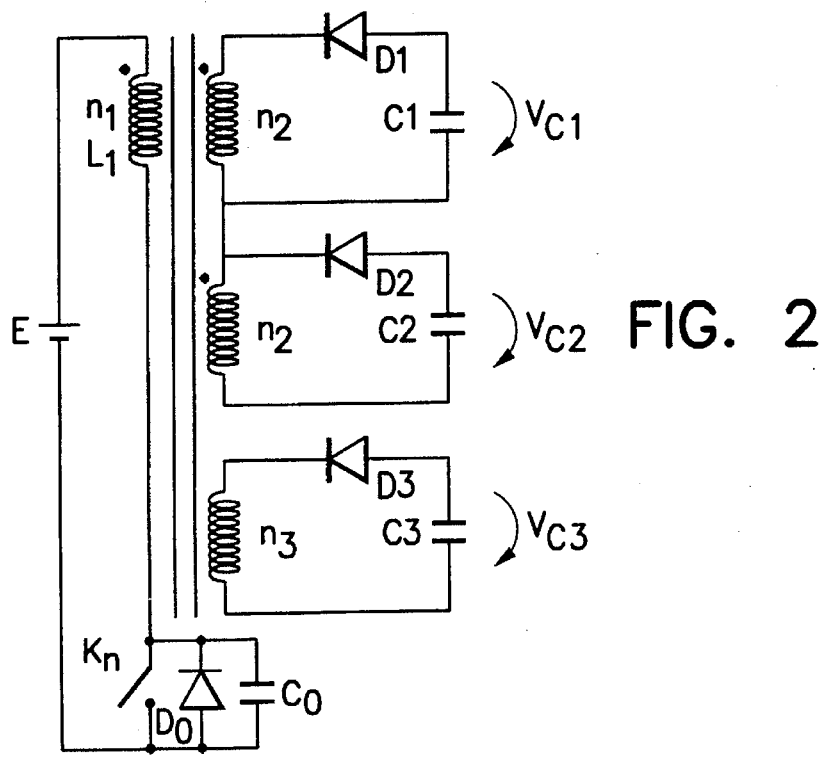
FIGS. 2 to 6 are further circuit diagrams, equivalent to that of FIG. 1, and explaining the operation of the same embodiment of the invention with the lamp extinguished.

Referring now to FIG. 2, this shows an equivalent circuit for the power supply circuit when the discharge lamp LAD is extinguished. The spark gap Ecl in FIG. 1 is assumed to be non-conducting. It will be noted that the power supply circuit includes the primary of the transformer Tr, the winding PRIM, the quasi-resonant interrupter, and a source E of unidirectional (e.g. direct current) voltage, consisting for example of the battery carried by the vehicle. On the secondary of the transformer Tr is the rectifying circuit 400, consisting of its three cells C1, D1; C2, D2; and C3, D3. The instantaneous voltages are measured across the capacitors C1 to C3.

Figure 3:
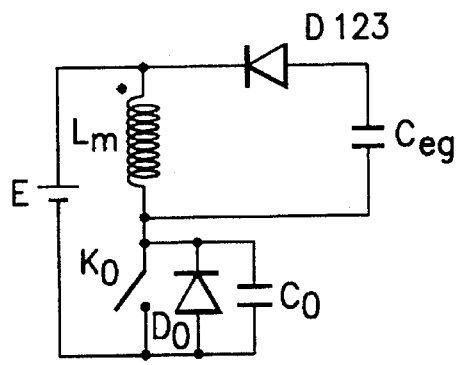

It is known that the magnitudes of the electrical parameters at the primary PRIM can be expressed as a function of the characteristics of the transformer Tr in accordance with the circuit diagram in FIG. 3. In particular, this comprises a diode D123 which is equivalent to the three diodes D1 to D3 of the rectifying cells in FIG. 1. In addition, the equivalent capacity Ceq is defined by the equation:

$$Ceq=(n2/n1)^2.C1+(n2/n1)^2.C2+(n3/n1)^2.C3,$$

with the following equal voltages across this equivalent capacitance:

$$(n1/n2).VC1=(n1/n2).VC2=(n1/n2).VC3.$$

FIGS. 2 to 3 will be explained mainly with the help of the graphs in FIGS. 7a to 7c, in which the operation of the system when the discharge lamp LAD is extinguished is illustrated by the curves I in full lines, while its operation when the discharge lamp LAD is lit is illustrated by the curves II in broken lines.

Figure 4:
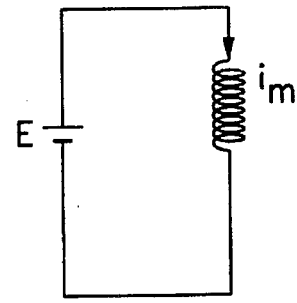

FIG. 4 is a diagram showing the first phase of power supply in the starting mode, starting from the state in FIG. 2. The interruptor K0 is closed, the diode D123 is non-conducting, the current passing through the primary winding Lm, namely the current im, is initially negative (see FIG. 7a). In this phase (phase 1 in FIG. 7b), it is found that the current i increases as a straight line function. The control circuit 4 detects, by means of a special current measuring means, that the current i is large enough, and switches the interruptor K0 by means of its control electrode 1 (FIG. 1). In another embodiment, the control unit 4 does not measure any particular parameter other than the predetermined switching time in phase 1, for a given power supply system, and it switches the interrupter at the end of this predetermined time period. During this phase 1, the voltage across the capacitor C0 is zero (see phase 1 in FIG. 7a) and the magnetic circuit of the transformer Tr stores the magnetic energy.

Figure 5:
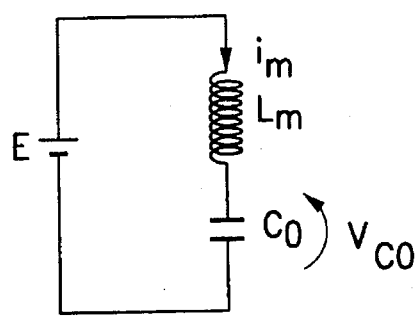
Figure 7A:
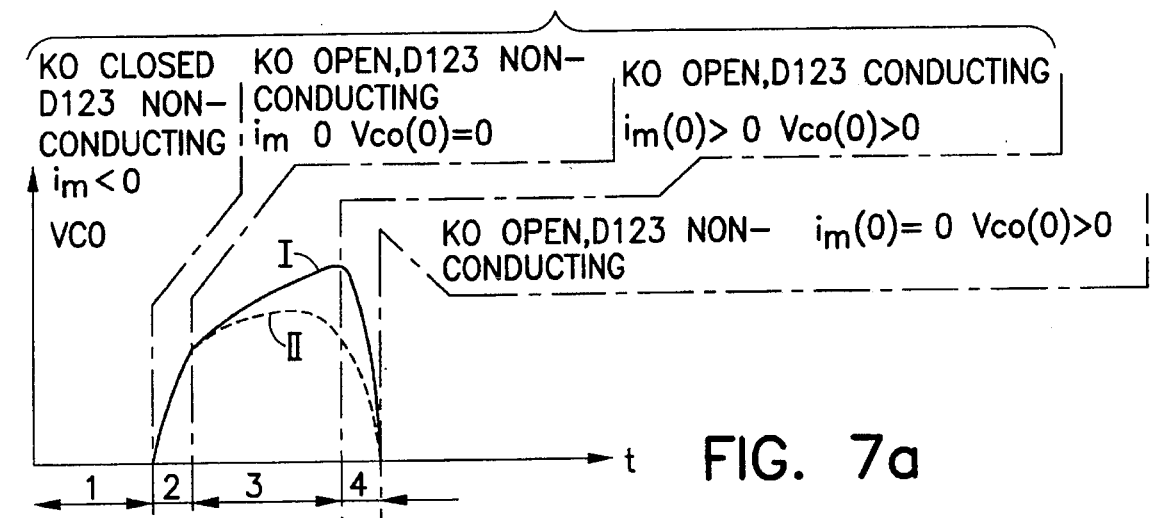
FIGS. 7a to 7d are graphs showing currents and voltages at various points in the circuit shown in FIGS. 1 to 6.
Figure 7B:
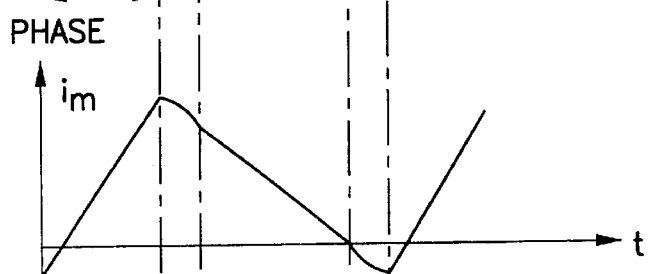

At the end of phase 2, the interrupter K0 is open, the diode D123 is non-conducting, and the magnetising current im is positive (see phase 2 in FIG. 7b). The equivalent circuit is shown in FIG. 5, in which a voltage VC0 appears across the capacitor C0. The capacitor C0 charges up, and the voltage VC0 across it (see phase 2 in FIG. 7a) increases, while the current im (see phase 2 in FIG. 7b) diminishes due to the fact that the magnetic circuit retains part of its energy.

Phase 2 terminates naturally when the voltage across the terminals of the winding Lm becomes small enough for the diode D123 to become conducting once again.

In another embodiment which is not shown in the drawings, the diode D123 consists of controlled interrupter in place of the diodes D1, D2 or D3, and is able to become conducting under the control of the control unit or control circuit 4 in response to measurements carried out by a measuring means. The latter are provided for the purpose in a manner which will be in the competence of a skilled person normally working in this technical field.

Figure 6:
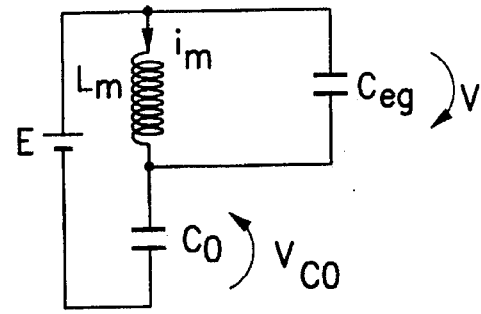

During phase 3, the interrupter K0 is open, the diode D123 is conducting, the magnetising current im is positive, and the voltage VC0 across the capacitor C0 is positive (see phase 3 in FIG. 7a). The equivalent diagram is given in FIG. 6, in which, the diode D123 being conducting, the equivalent capacitor Ceq is connected across the winding Lm.

Due to the derivation by means of the diode D123, the voltage across the capacitor C0, i.e. VC0, increases less quickly here than in phase 2 (see phase 3 in FIG. 7a). The voltage VC1 across the capacitor Ceq, which was constant during phases 1 and 2 because the diode D123 isolated the capacitor from the rest of the circuit, now increases because the charge in the capacitor increases (see phase 3 in FIG. 7c). Elimination of the currents in the diode D123 terminates phase 3 (see FIG. 7b), and at that instant the primary current also disappears.

This end can be achieved in the above mentioned modified embodiment which is not shown, for example as a function of the characteristics of the desired light flux produced by the discharge lamp LAD in response to the measurements taken by the measuring means 5 which is connected to the input of the control circuit 4.

At the beginning of phase 4, the interrupter K0 is open, the diode D123 is non-conducting, the magnetising current im is zero, and the voltage across the capacitor C0 is positive (see phase 4 in FIG. 7a).

Reverting to the equivalent diagram of FIG. 5, the voltage VC1 across the equivalent capacitor Ceq, in particular remains constant and equal to a value which is higher than its value during phases 1 and 2. It follows therefore that the voltage that is available on the original capacitors C1, C2 and C3 of the equivalent capacitor C123 increases.

The current im flowing through the winding Lm then becomes negative, the effect of which is to discharge the capacitor C0 when the voltage VC0 reduces (see phase 4 in FIG. 7a). Phase 4 terminates naturally when the diode D0 of the quasi-resonant interruptor once again becomes conducting. The current im will therefore increase, and it will become necessary to close the interrupter K0 rapidly before the current im becomes positive once again.

A succession of operating cycles has thus been described, controlled mainly, with the discharge lamp LAD extinguished, by the switching of the interrupter K0 under the control of the control circuit 4, in response to measurements, especially of voltage V carried out by a suitable measuring means, so as to regulate the cut off frequency.

FIGS. 8 to 13 show the same operation when the discharge lamp LAD is lit. The latter constitutes a resistive load for the power supply circuit, in particular if the thermal state of the discharge lamp LAD is properly established.

In FIGS. 8 to 13, the same elements as those in FIGS. 2 to 6 are designated by the same reference numerals, and their functions will not be described again.

Referring therefore to FIGS. 8 to 13, it is assumed that at the outset, the interrupter K1 of the half-wave bridge is closed and that the interrupter is open. Since such a phase lasts for several hundred switching periods of the interrupter K0, this can be treated as being a permanent state. The long switching period of K1 and K2 serves only to change the sign of the voltage across the load. The diagram of FIG. 2 is then converted according to the diagram in FIG. 8, in which the equivalent winding L of the transformer Tr' of the starting means 200 in FIG. 1 is present, as is a resistance R representing the discharge lamp LAD. In operation, when the discharge lamp LAD is lit, the interruptor K0 works in the same way as when the lamp LAD is extinguished. Similarly, the equivalent diode DE1 shown in FIG. 9 follows the same states, i.e. conducting or non-conducting, as the equivalent diode D123.

Figure 10:
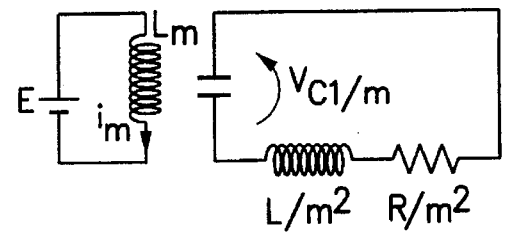
Figure 11:
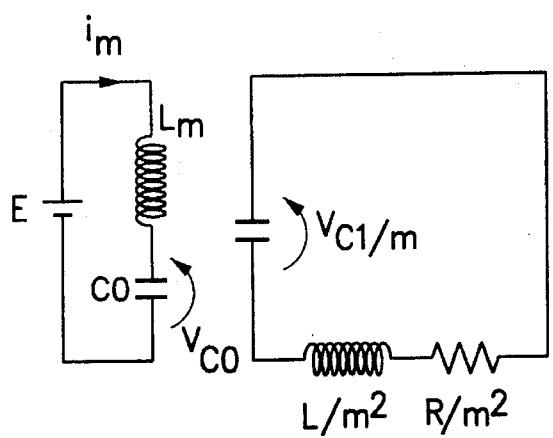
Figure 12:
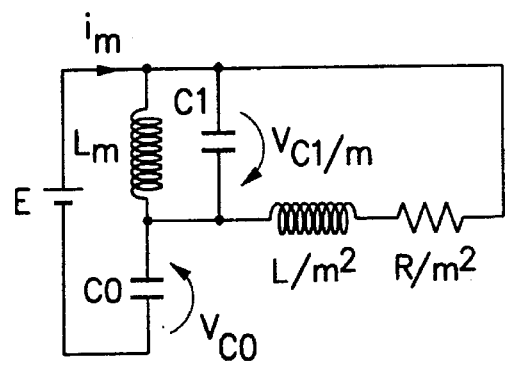

At the beginning of phase 1, as shown in FIG. 10 as an equivalent diagram, the interrupter K0 is closed, the diode DE1 is non-conducting, the current im in the winding Lm is negative, and the voltage VC1 across the capacitor C1 is positive. As a result of this, the capacitor C1 discharges into the series circuit comprising the equivalent inductance $L/m^2$ of the starting transformer Tr' and the equivalent resistance $R/m^2$ of the discharge lamp LAD. In these values, m is the transformation ratio of the transformer Tr, and is given by the equation:

$$m = n2/n1.$$

Figure 7C:
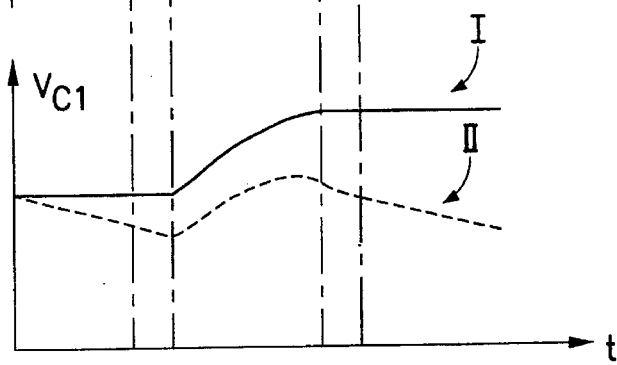

This causes the voltage across the capacitor C1 to diminish (see phase 1, curve II in FIG. 7c). The other parameters are unchanged.

The control circuit 4 measures the current in the winding Lm, and opens the interrupter K0 when the value of the current im flowing through it has become sufficiently positive (see phase 1 in FIG. 7b). In another embodiment, the control circuit 4 imposes a conducting period and a non-conducting period on the interrupter K0, and the working mode is automatically established.

At the beginning of phase 2, the interrupter K0 is open, the diode DE1 is non-conducting, the current im in the winding LM is positive, and the voltage VC0 across the capacitor C0 is again zero.

The capacitor C1 continues to discharge (see its voltage VC1, phase 2 in FIG. 7c, curve II in broken lines). The equivalent diagram is FIG. 11. At the end of phase 2, which is determined in the same way as in the mode of operation described above in which the discharge lamp LAD is extinguished, the diode DE1 becomes conducting once more. The phase 2 is a simple extension of phase 1, with the introduction of the capacitor C0 in the left hand loop in the diagram of FIG. 11.

At the beginning of phase 3, the interrupter K0 remains open, and the diode DE1 is conducting. The equivalent diagram here is FIG. 12. The voltage E is equal to the sum of the voltage across the winding Lm and that across the capacitor C0. The cut-off frequency is high enough at the level of the interrupter K0 for the inductance $L/m^2$ to be a source of current over one switching period of the interrupter K0. For this reason, the voltage VC0 describes a portion of a sine curve of short period before the period of phase 3. The latter terminates when the current in D1 becomes zero, that is to say when the current in the winding Lm is equal to that in the capacitor C0.

At the beginning of phase 4, the interrupter K0 is open, the diode D1 is non conducting, and the current im in the winding Lm is substantially zero. The equivalent diagram of FIG. 11 then applies once again.

It follows that the voltage VC1 across the capacitor C1 diminishes as in phases 1 and 2 (see phase 4, curve II in broken lines in FIG. 7c), and the voltage VC0 across the capacitor C0 describes a decreasing portion of a sine curve until it becomes zero (phase 4, curve II in broken lines in FIG. 7a).

Figure 7D:
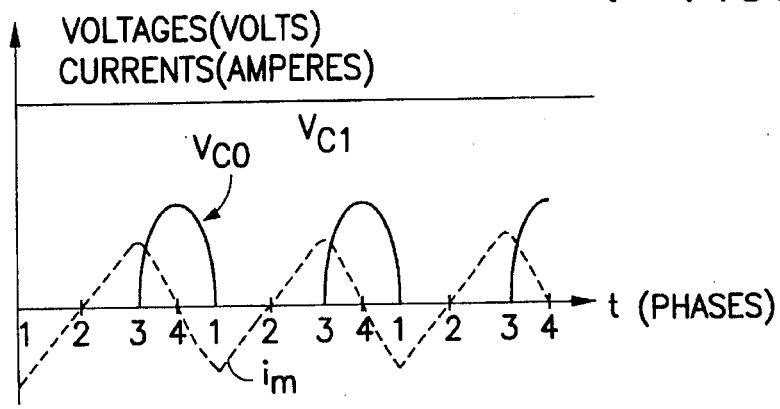
Figure 8:
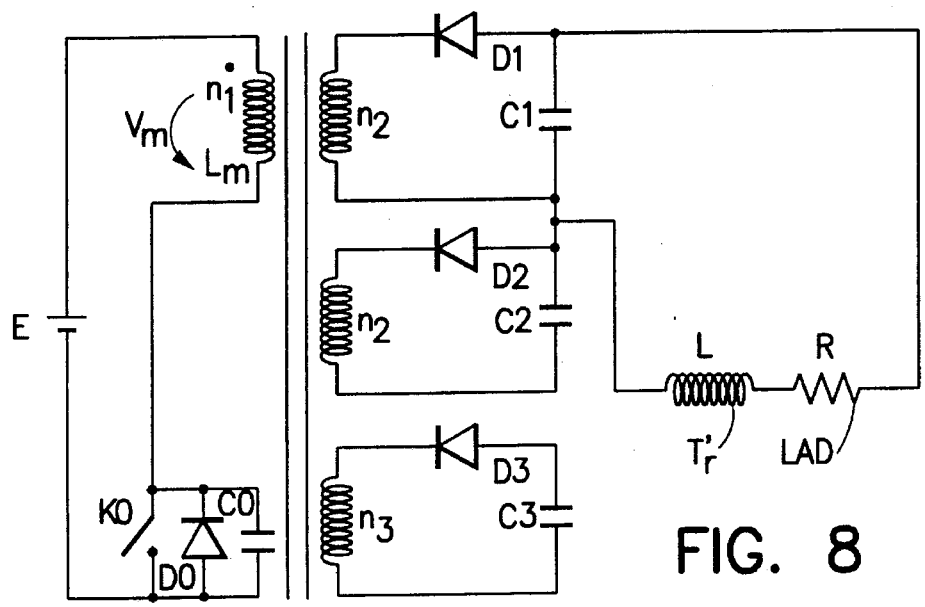
Figure 9:
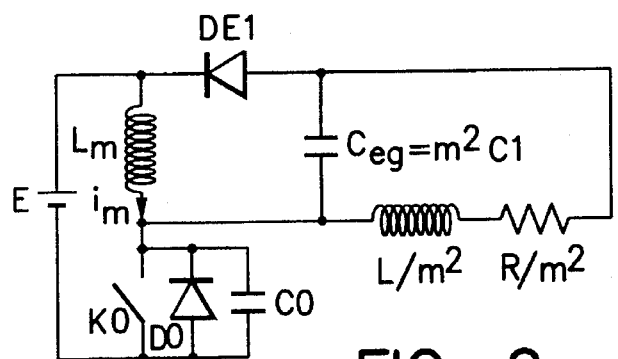

In FIG. 7d, the curve representing the current im in the winding Lm is shown in broken lines, while the curve representing the voltage C0 across the capacitor VC0, when the voltage VC1 across the capacitor C1 has reached a maximum value at which it remains non-conducting, is shown in full lines. It will be noted that the energy received but not consumed in the convertor is restored on the source E.

This mode of operation can occur in certain fault situations, or in some cases of displacement of the adjusting points (due for example to aging of components and so on). The invention therefore has the advantage of proposing a mode of operation which is non-dissipative and non-destructive, since the voltages remain below the threshold voltage for triggering the spark gap.

The cycles, each consisting of the four phases 1 to 4, are repeated throughout the working phase.

Referring now to FIG. 14, this shows a circuit which is equivalent to the circuit of FIG. 1 when the discharge lamp LAD is extinguished, and when the starting circuit 200 comes into action, it being supposed that the interrupter K1 is closed and the interrupter K0 is open. When the spark gap Ecl is triggered, the discharge lamp LAD is extinguished, this being represented by an open loop in FIG. 14, while the spark gap is substantially equivalent to a short circuit. It will be supposed that initially the interrupter K1 is closed and the interrupter K2 is open.

The spark gap fires during phase 3, when operating in a vacuum after a few thousand periods, during which it remains extinguished. During this phase, the equivalent circuit is analogous to that in FIG. 13, the equivalent capacitor being given by the equation:

$$Ceq = M^2 \cdot C3.$$

The voltage V across the terminal of the winding Lm' representing the starting transformer Tr' thus decreases. Since this voltage is proportional to the derivative of the current flowing through it, the diagrams shown in FIGS. 15A and 15B can be derived. This current, and this voltage, appear when the spark gap is triggered, which happens almost immediately after the start of phase 3 of the vacuum operation. During this phase the diodes D1 and D2 are non-conducting, and the diode D3 is conducting. It will be noticed that if m' is the transformation ratio the starting voltage V (see FIG. 15a) is then applied in a step-up ratio to the discharge lamp LAD at a value m'V. The values for m' and V are thus chosen so as to enable the discharge lamp LAD to fire as from the first voltage pulse V, i.e. in a very brief time.

Other arrangements are possible for the system of the invention. In particular, it is possible to use rectifying devices other than the cells D, C. In addition, other components may be introduced into the circuit described, according to the characteristics of the two transformers. In particular, the diodes D1 and D2 may be connected in opposite senses to each other. For example, if the diode D1 is connected at the head of the winding En1, the foot of the winding En1 is connected in series with the head of the winding En2, while the diode D2 is connected to the foot of the winding En2. The switching operations of the three interrupters which are at the heart of the invention are triggered by the control circuit 4, with the aid of the measuring means 5.

The two interrupters K1 and K2 of the half-wave bridge operate independently of the switching of the quasi-resonant interrupter I0, and in phase opposition to each other. Their control electrodes are activated by the control unit 4.

In order that the half-wave bridge can function, it is necessary that the two interrupters K1 and K2 remain open simultaneously for a short instant. This simultaneous opening sets up a very brief transient, since the continuity in the current in the secondary of the starting transformer implies putting one of the diodes connected in anti-parallel relationship with K1 and K2 rapidly into the conductive state. As a result of this, the equivalent diagrams of the convertor which are described above are identical, regardless of which of the interrupters K1 or K2 is conducting.

The switching frequency of these interrupters is so determined as to be much lower than that of K0. Accordingly, the operation of the power supply circuit consists of a succession of states which are established with periodic reversal of the direction of the delivered voltage, these reversals being caused by the switching operations of the half-wave bridge.

The starting procedure which has been described in the present application may be achieved using devices for generating a high voltage other than a spark gap. In particular, a semiconductor component may be used.

Similarly, the rectifying devices may be modified and may have any other structure compatible with the method of operation described above.

What is claimed is:

1. An electric lighting system comprising a discharge lamp having a first and a second terminal, and a power supply circuit connected to the discharge lamp, wherein the power supply circuit comprises:

starting means having a first terminal and an output terminal;

an alternating low voltage generating circuit; and a working power supply means connected to the alternating voltage generating circuit for supplying power continuously to the discharge lamp, wherein the working power supply means comprises:

a rectifying means for rectifying at least one cycle of said alternating voltage and having at least one pair of output terminals for producing a mean rectified voltage between the pair of output terminals, and a third terminal adapted to be maintained at a potential intermediate between those of the pair of output terminals;

a pair of interrupters connected in series with the output terminals of the rectifying means and defining a common point connected to the first terminal of the discharge lamp, the power supply circuit further including a control circuit for producing a voltage and a current whereby to maintain the light output of the discharge lamp, the second terminal of the discharge lamp being connected to the output terminal of the starting means, the first terminal of the starting means being connected to the third terminal of the rectifying means;

the alternating low voltage generating circuit comprising:
a wave generator, quasi-resonant in voltage and comprising a step-up voltage transformer having a primary winding and at least one secondary winding, the system further comprising a source of direct current voltage and
at least one interrupter, quasi-resonant in voltage, having a control electrode and a high voltage output, the direct current voltage source having a first and a second terminal, the first terminal being connected to the primary winding of the transformer, and the at least one interrupter being connected between the primary winding and the second terminal of the direct current voltage source, with its control electrode connected to the control circuit and its high voltage output comprising the at least one secondary winding of the transformer;

the pair of interrupters connected in series with the rectifying means constituting a half wave bridge, being arranged to operate independently of the switching of the quasi-resonant interrupter and in phase opposition to each other, each interrupter of said pair having a control electrode connected to the control means so as to be activated by the control means at a frequency lower than that of the quasi-resonant interrupter.

2. A system according to claim 1, wherein the working power supply means defines at least one cell, the cell comprising a capacitor and a diode.

3. A system according to claim 1, wherein the quasi-resonant interrupter comprises a parallel circuit comprising a controlled interrupter having a control electrode, a diode and a capacitor, with means connecting the quasi-resonant interrupter in series with the leakage inductance of the primary winding of the said transformer.

4. A system according to claim 1, wherein the starting means includes a transformer having a primary and a secondary, a rectifying circuit connected to one end of the primary of the transformer, and a spark gap having a first and a second terminal, the first terminal being connected to the other end of the primary winding of the transformer and the second terminal being connected to an output terminal of the rectifying circuit for producing, when triggered, a high working voltage for the discharge lamp, the secondary winding of the transformer of the starting means being connected between a first terminal of the discharge lamp and an output terminal of the working power supply means, whereby the starting means comprises a voltage step-up series circuit constituted by said secondary winding, a triggering voltage of the spark gap being so selected as to cause the discharge lamp to fire.

5. A system according to claim 1, wherein the quasi-resonant interrupter connected to the primary winding of the said transformer is adapted to work at a first frequency in the starting mode of the discharge lamp, the first frequency being sufficient to produce a voltage at the output terminals of the rectifying means such as to activate the starting means, and a second frequency, higher than the first frequency, in the working mode of the discharge lamp.

6. A system according to claim 1, wherein the control means comprises measuring means for measuring operating parameters of the discharge lamp and is adapted to open the quasi-resonant interrupter at the start of a working cycle of the discharge lamp when the current in the appropriate transformer winding has reached a predetermined positive value, and to close it when the voltage across the quasi-resonant interrupter is zero.

7. A system according to claim 1, wherein the control means is adapted to open the quasi-resonant interrupter at the end of a first predetermined time period in response to predetermined parameters of the power supply circuit, and to close the quasi-resonant interrupter at the end of a second pre-determined period of time in response to predetermined parameters of the power supply circuit.

8. A system according to claim 1, wherein the discharge lamp is part of a vehicle headlamp.

* * * * *